(12) United States Patent
Nelson et al.

(10) Patent No.: US 12,131,140 B2
(45) Date of Patent: Oct. 29, 2024

(54) METHODS AND SYSTEMS TO AUTOMATICALLY DEPLOY VULNERABILITY FIXES FOR SOFTWARE AND FIRMWARE COMPONENTS

(71) Applicant: DELL PRODUCTS L.P., Round Rock, TX (US)

(72) Inventors: Amy C. Nelson, Round Rock, TX (US); Prasanth K S R, Bangalore (IN); Vivekanandh Narayanasamy Rajagopalan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 399 days.

(21) Appl. No.: 17/486,791

(22) Filed: Sep. 27, 2021

(65) Prior Publication Data
US 2023/0097733 A1   Mar. 30, 2023

(51) Int. Cl.
| | | |
|---|---|---|
| G06F 8/61 | (2018.01) | |
| G06F 8/65 | (2018.01) | |
| G06F 8/71 | (2018.01) | |
| G06F 21/57 | (2013.01) | |

(52) U.S. Cl.
CPC ............. *G06F 8/61* (2013.01); *G06F 8/65* (2013.01); *G06F 8/71* (2013.01); *G06F 21/577* (2013.01)

(58) Field of Classification Search
None
See application file for complete search history.

(56) References Cited

U.S. PATENT DOCUMENTS

| | | | | |
|---|---|---|---|---|
| 6,151,643 | A * | 11/2000 | Cheng | G06F 8/61 |
| | | | | 709/200 |
| 11,119,754 | B1 * | 9/2021 | Sun | G06F 8/65 |
| 2002/0174422 | A1 * | 11/2002 | Kelley | G06F 8/65 |
| | | | | 717/169 |
| 2004/0187103 | A1 * | 9/2004 | Wickham | G06F 8/65 |
| | | | | 717/174 |
| 2006/0112152 | A1 * | 5/2006 | Napier | G06F 8/658 |
| | | | | 707/999.203 |

(Continued)

OTHER PUBLICATIONS

O'Driscoll, Comparitech.com, "25+ Cyber Security Vulnerability Statistics And Facts Of 2021", Apr. 14, 2021, 12 pgs.

(Continued)

*Primary Examiner* — Marina Lee
(74) *Attorney, Agent, or Firm* — Egan, Enders & Huston LLP.

(57) ABSTRACT

Methods and systems are provided that may be implemented to methods and systems may be implemented to automatically identify types and status of vulnerabilities in identified software or firmware components (e.g., libraries), and then automatically deploy security vulnerability fixes (e.g., patches or updates) in these identified components across different affected software or firmware applications. In one example, the disclosed methods and systems may operate to dynamically and automatically aggregate identified third party software and/or firmware vulnerabilities into a centralized repository, and may be further implemented to automatically handle the roll out and deployment of vulnerability fixes to patch or update third party libraries to solve any security vulnerability reported on these third party libraries.

19 Claims, 4 Drawing Sheets

(56) References Cited

U.S. PATENT DOCUMENTS

2012/0054731 A1* 3/2012 Aravamudan ............ G06F 8/63
717/170
2018/0129793 A1* 5/2018 Ulis ........................ G06F 21/12

OTHER PUBLICATIONS

Wisenhoff, "Vulnerabilities In Dependencies: What You Need To Know Debricked", Debricked.com, Jan. 2, 2021, 4 pgs.
Best CPG Software, "What Is Consumer Packaged Goods Software", 2021 Reviews & Pricing, Jul. 7, 2021, 4 pgs.
Wikipedia, "Common Vulnerabilities And Exposures", Jul. 6, 2021, 6 pgs.
Wikipedia, "Common Vulnerability Scoring System", Jun. 2019, 15 pgs.
CVE-Terminology, cve.mitre.org, Obtained from Internet Sep. 3, 2021, 3 pgs.
Dell, "Dell Command Cloud Repository Manager", Dec. 23, 2020, 2 pgs.
Dell, "Dell Command Update Dell US", Jun. 2021, 5 pgs.
Dell Technologies, "Support Assist For Business PCs", Apr. 2020, 14 pgs.
Dell TechDirect, "Customer Overview", Obtained from Internet Sep. 2, 2021, 12 pgs.
Netwonsoft.com, "Introduction", Obtained from Internet Jul. 11, 2021, 2 pgs.
Dell, "Dell OpenManage Essentials", Aug. 2014, 4 pgs.
Wikipedia, Jenkins (Software), Aug. 30, 2021, 7 pgs.
Wikipedia, "Libxml2", Jun. 26, 2021, 2 pgs.
Wikipedia, "Microsoft System Center Configuration Manager", Jun. 25, 2021, 6 pgs.
Newtonsoft.com, "Newtsonsoft.JSO, Namespace", Obtained from Internet Jul. 11, 2021, 6 pgs.
Nvd.Nist.gov, "NVD-Vulnerability Detail Pages", Obtained from Internet Sep. 3, 2021, 5 pgs.
Wikipedia, "OpenSSL", Jun. 29, 2021, 13 pgs.
Wikipedia, "Palamida", Sep. 3, 2020, 3 pgs.
Whitesourcesoftware.com, Product Overview WhiteSource Software, Obtained from Internet Jul. 11, 2021, 5 pgs.
Wikipedia, "Synopsys", Jul. 29, 2021, 8 pgs.
Windows-Security.org, "Turn Off Inventory Collector Windows Security Encyclopedia", Obtained from Internet Sep. 1, 2021, 1 pg.
Debricked.com, "Vulnerabilities In Dependencies, Third Part Components And Open Source-What You Need to Know", Jan. 2, 2021, 13 pgs.
Google Docs, "What Is Pub/Sub? Cloud Pub/Sub Documentation Google Cloud", Obtained from Internet Jul. 11, 2021, 6 pgs.
Wikipedia, "WhiteSource", May 16, 2021, 3 pgs.
Whitesourcesoftware.com, Why Choose WhiteSource Over Flexera (Revenera)?, Obtained From Internet Jul. 11, 2021, 7 pgs.
Dell Technologies, Technical White Paper, "Windows Driver Updates With OpenManage Enterprise 3.4", Jul. 2020, 14 pgs.

* cited by examiner

METHODS AND SYSTEMS TO AUTOMATICALLY DEPLOY VULNERABILITY FIXES FOR SOFTWARE AND FIRMWARE COMPONENTS

FIELD

This application relates to information handling systems and, more particularly, to vulnerability fixes for software libraries.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Over the past two decades the way modern data centers are being designed and deployed has changed drastically. Evolution of Virtualization and Cloud technologies have changed the course of Software Development. These technologies are designed to cope with market demands, and an increasing number of third-party/open source software and firmware applications are being integrated together in order to meet the demands and workloads and to achieve scalabilities.

Most software and firmware application products currently installed on endpoint information handling systems include one or more third party software or firmware components that are integrated into the application. These third party components are provided by entities other than the OEM or customer who purchases and uses the endpoint information handling systems. Most of these third party software and firmware components are common across multiple different software and firmware products (including tools and applications provided by original equipment manufacturers "OEMs" of endpoint client systems to their corporate customers for managing their endpoint systems). Examples of such common third party software and/or firmware components are libxml, openssl, newtonsoft, etc. If there is a common software or firmware library included in more than one different application, then all the different applications that include this common software or firmware library need to replicate the same effort to patch/backport the same security vulnerability fix for the common software or firmware library. This increases the overall time to fix (TTF) security vulnerabilities, and may become tedious and time consuming for vendors and users of endpoint information handling systems and their software and firmware components.

Currently, third party library scanning tools (e.g., such as Palamida, Black Duck, White Source, etc.) are employed on servers to help analyze, identify and report security-related and licensing-related vulnerability issues. The increasing number of vulnerabilities reported for third party software and firmware components has resulted in shorter vulnerability response times as part of current security policies.

Dell Cloud Command Repository Manager (DCCRM) is a catalog server tool from Dell Technologies Inc. of Round Rock, Texas that runs on a server to produce a catalog based on selections made by information technology (IT) managers of software and firmware updates for their platforms. Dell Command Update is a separate update tool available from Dell Technologies Inc. of Round Rock, Texas that provides endpoint client systems with updates to drivers, firmware, BIOS and applications to address identified vulnerability issues. Dell Command Update runs as an update agent on individual endpoint client systems to deploy software and firmware provided across a network from a catalog generated by DCCRM. Dell Inventory Collector is an agent available from Dell Technologies Inc. of Round Rock, Texas that runs on an individual client system to identify versions of drivers, firmware, BIOS and applications currently installed on the individual client system and to provide this information to Dell Command Update so that these identified versions of drivers, firmware, BIOS and applications may then be updated on the individual client system by Dell Command Update from the catalog of software and firmware updates generated and provided to Dell Command Update by DCCRM.

Due to a requirement that a full development cycle be performed to roll out a fix for identified vulnerabilities for a given application, a time gap currently exists between identification of a third party component vulnerability and the later roll out of a fix (e.g., patch or update) to address the identified vulnerability to all the different affected software and firmware applications. Each of DCCRM and Dell Command Update addresses vulnerability in their individual release based on a Vulnerability Response Timeline set by the OEM for its endpoint systems, e.g., a low severity vulnerability needs to be patched within 180 days from the date of reporting of the vulnerability, a medium severity vulnerability needs to be patched within 120 days from the date of reporting of the vulnerability, and a high severity vulnerability needs to be patched within 30 days from the date of reporting of the vulnerability. Corporate IT managers must manually add identified fixes (e.g., patches or updates) to their DCCRM catalogs, from which they are then deployed to individual endpoint client systems. An existing notification system highlights security updates as "Critical-Security" with no knowledge in the catalog system as to why the update is classified as a "security" update.

SUMMARY

Disclosed herein are methods and systems that may be implemented to identify and roll out needed software and firmware fixes automatically, e.g., under the control or direction of an IT decision maker (ITDM) such as a corporate IT administrator. In one embodiment, the disclosed methods and systems may be implemented in this manner to bridge (e.g., shorten or eliminate) the time gap that conventionally exists between identification of a given third party software or firmware component (e.g., given third party software or firmware library) vulnerability and the roll out (e.g., distribution) of a corresponding fix (e.g., patch or update) to address the identified vulnerability to all the different affected software and firmware applications that are affected by the identified third party component vulnerability, e.g., including tools and applications provided by original equipment manufacturers (OEMs) of endpoint information handling systems to their corporate customers for managing these end point systems. In this way, the disclosed methods and systems may be implemented without the conventional requirement that every affected application go through a full development cycle to roll out a fix for identified third party security vulnerabilities.

In one embodiment, the disclosed methods and systems may be implemented to automatically identify types and status of vulnerabilities in identified software or firmware components (e.g., libraries), and then seamlessly and automatically deploy security vulnerability fixes (e.g., patches or updates) in these identified components across different affected software or firmware applications. Examples of such affected software and firmware components include third party software and firmware components that are provided by entities other than an OEM manufacturer of endpoint client systems or a customer of the OEM who purchases and operates the endpoint information handling systems. In one embodiment, the disclosed methods and systems may operate to dynamically and automatically aggregate identified third party software and/or firmware vulnerabilities into a centralized repository. The disclosed methods and systems may be further implemented to automatically handle the roll out and deployment of vulnerability fixes to patch or update third party libraries to solve any security vulnerability reported on these third party libraries, and in a manner that supports faster vulnerability response times set by an OEM security policy. This is in contrast to conventional techniques for fixing software and firmware vulnerabilities in which neither a catalog server tool or client endpoint system update tool has any awareness of the vulnerability status of any third party libraries, and in which there is no automation for pulling in the vulnerabilities and automatically generating a catalog based on patching or updating the vulnerable libraries.

In one respect, disclosed herein is a method, including: producing a catalog including current versions of one or more software or firmware components used by a software or firmware application together with information that specifies that the identity of at least one software or firmware application that uses the one or more software or firmware components; receiving across at least one network an identity of a vulnerability that is present in the current version of a first one of the one or more software or firmware components maintained in the catalog; receiving across the at least one network a new version of the first software or firmware component that does not include the identified vulnerability, and modifying the catalog to replace the current version of the first software or firmware component with the new version of the first software or firmware component; providing the modified catalog to at least one network storage location present on the at least one network; producing an inventory that identifies installed software or firmware applications on an endpoint client system that is communicatively coupled to the at least one network, at least one of the identified installed software or firmware applications using the first software or firmware component; accessing the information of the catalog on the at least one network storage location to determine that the catalog includes a new version of the first software or firmware component used by at least one of the installed software or firmware applications; and then retrieving the new version of the first software or firmware component from the catalog across the at least one network from the network storage location, and installing the new version of the first software or firmware component onto the endpoint client system for use by the at least one installed software or firmware application.

In another respect, disclosed herein is a system, including at least one first information handling system configured as an endpoint client system including at least one programmable integrated circuit and being coupled to at least one network. The at least one programmable integrated circuit of the endpoint client system may be programmed to: produce an inventory that identifies installed software or firmware applications on the endpoint client system, at least one of the identified installed software or firmware applications using a current version of a first software or firmware component; access information of a catalog maintained on at least one network storage location to determine that the catalog includes a new version of the first software or firmware component used by the at least one installed software or firmware application; then retrieve the new version of the first software or firmware component from the catalog across the at least one network from the network storage location; and then install the new version of the first software or firmware component onto the endpoint client system for use by the at least one installed software or firmware application.

In another respect, disclosed herein is a method, including: producing an inventory on an endpoint client system that identifies installed software or firmware applications on the endpoint client system, at least one of the installed software of firmware applications using a current version of a first software or firmware component; accessing, from the endpoint client system, information of a catalog maintained on at least one network storage location to determine that the catalog includes a new version of the first software of firmware component that corresponds to the current first software or firmware component that is used by at least one of the installed software or firmware applications on the endpoint client system; then retrieving to the endpoint client system the new version of the first software or firmware component from the catalog across the at least one network from the network storage location; and then installing the new version of the first software or firmware component onto the endpoint client system for use by the at least one installed software or firmware application.

DESCRIPTION OF ILLUSTRATIVE EMBODIMENTS

Figure 1:
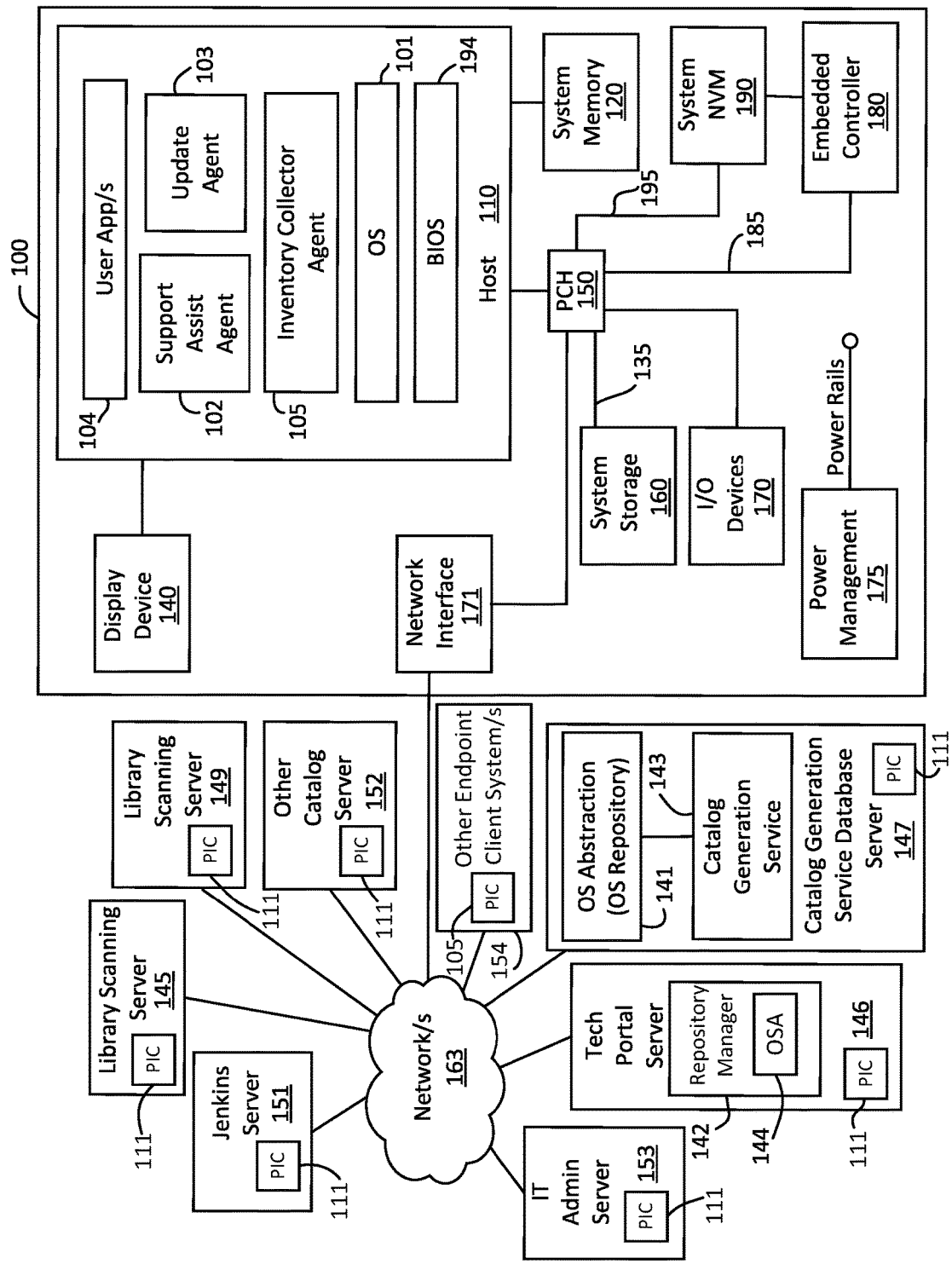
FIG. 1 illustrates a block diagram of a client information handling system and vulnerability fix system according to one exemplary embodiment of the disclosed methods and systems.

FIG. 1 is a block diagram of an endpoint client system 100 (e.g., an information handling system such as a desktop computer, laptop computer, tablet computer, etc.) as it may be coupled via a network/s 163 to other network components of a system that is configured to automatically deploy vulnerability fixes for software and firmware components (e.g., software and firmware libraries) according to one embodiment of the disclosed methods and systems. In this regard, it should be understood that the configuration of FIG. 1 is exemplary only, and that the disclosed methods may be implemented on other types of information handling systems and/or architectures of vulnerability fix systems. It should be further understood that while certain components of an endpoint client system and a vulnerability fix system are shown in FIG. 1 for illustrating embodiments of the disclosed methods and systems, the endpoint client system and/or other vulnerability fix system components are not restricted to including only those components shown in FIG. 1 and described below.

As shown in FIG. 1, endpoint client system 100 may include a host programmable integrated circuit 110 which may include any type of processing device, such as an Intel central processing unit (CPU), an Advanced Micro Devices (AMD) CPU or another programmable integrated circuit. Host programmable integrated circuit 110 is coupled as shown to system memory 120, which may include, for example, random access memory (RAM), dynamic RAM (DRAM), synchronous DRAM (SDRAM), etc. In the embodiment of FIG. 1, host programmable integrated circuit 110 may be configured to access system non-volatile memory 190 (e.g., serial peripheral interface (SPI) Flash memory) to load and boot part of a system BIOS 194, etc. In one embodiment, endpoint client system 100 may be one endpoint client system among a group of endpoint client system/s 159 (e.g., with each system 159 configured as an endpoint client system having software/firmware and hardware components (including programmable integrated circuit/s 105 together with system memory, system storage, network interface, etc. configured the same or similar to endpoint client system 100) that are coupled to receive software and/or firmware vulnerability fixes that are automatically identified and deployed across network/s 163 by the other components (e.g., servers 145, 146, 147, 149, 151, 152 and IT Administrator system/server 153) of a vulnerability fix system such as illustrated in FIG. 1.

In FIG. 1, host programmable integrated circuit is shown executing an operating system (OS) 101 (e.g., proprietary OS such as Microsoft Windows 10, open source OS such as Linux OS, etc.) and BIOS 194 for system 100, as well as user software applications 104. Examples of user software applications 104 include, but are not limited to, locally-executing applications such as word processing applications, email applications, messaging applications, Internet browsers, computer games, PDF viewers, spreadsheet applications, etc. Also executing on host programmable integrated circuit in FIG. 1 is an enhanced inventory collector agent or module 105 (e.g., third party library handler), support assist agent 102 (e.g., Dell SupportAssist agent available from Dell Technologies Inc. of Round Rock, Tex.), and update agent 103 that provides software and firmware updates (e.g., updates to BIOS, device firmware, drivers, applications, etc.) to endpoint client systems 100/159 (e.g., Dell Command Update agent available from Dell Technologies Inc. of Round Rock, Texas).

In the embodiment of FIG. 1, host programmable integrated circuit 110 may be coupled to an external or internal (integrated) display device 140 (e.g., LCD or LED display device or other suitable display device) of system 100. In such an embodiment, integrated graphics capability may be implemented by host programmable integrated circuit 110 to provide visual images (e.g., a graphical user interface, static images and/or dynamic content such as video images) to display device 140 for display to a system user. It will be understood that in other embodiments a separate programmable integrated circuit (e.g., such as graphics processor unit "GPU") may be coupled between host programmable integrated circuit 110 and display device 140 to provide graphics capability for endpoint client system 100.

In the embodiment of FIG. 1, a platform controller hub (PCH) 150 of endpoint client system 100 controls certain data paths and manages information flow between components of the endpoint client system 100. As such, PCH 150 may include one or more integrated controllers or interfaces for controlling data paths connecting PCH 150 with host programmable integrated circuit 110, system storage 160, input/output (I/O) devices 170, network interface (I/F) device 171, out-of-band programmable integrated circuit in the form of an embedded controller 180, and system NVM 190 storing logic components such as firmware image and settings for BIOS 194, ACPI firmware, etc. In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

As shown in FIG. 1, external and/or internal (integrated) I/O devices 170 (e.g., a keyboard, mouse, touchpad, touchscreen, etc.) may be coupled to PCH 150 of system 100 to enable a local human user to input data to, and otherwise interact with, endpoint client system 100, and to interact with application programs or other software/firmware executing on host programmable integrated circuit 110. The network interface device 171 enables wired and/or wireless communication with enrollment system components of FIG. 1 via an external network/s 163, which may be the Internet. In one embodiment, network OF device 171 may be a network interface controller (NIC) which may optionally communicate with external network/s 163 across one or more other intervening networks, e.g., such as an internal network (e.g., corporate intranet and/or local area network (LAN) or wireless LAN, and/or possibly across other networks such as a cellular network, etc. It will be understood that one or more of the other network components of FIG. 1 (e.g., server information handling systems 145, 146, 147, 149, 151, 152 and IT Administrator system/server 153) may be configured in one embodiment with one or more similar components (e.g., system memory, system storage, network interface, etc.) and/or similar system architecture as endpoint client system 100, and may also include respective programmable integrated circuit/s 111 as shown for executing respective logic for each server system to perform its actions that are described elsewhere herein.

In FIG. 1, local system storage 160 of endpoint client system 100 may include one or more media drives, such as hard disk drives (HDDs), optical drives, NVRAM, Flash memory, solid state drives (SSDs), or any other suitable form of internal or external storage that is coupled via data bus (e.g., PCIe bus. SATA bus, etc.) 135 through PCH 150 to provide non-volatile storage media for endpoint client system 100. A power source for endpoint client system 100 may be provided via an external power source (e.g., mains power) and an internal power supply regulator, and/or by an internal power source, such as a battery. As shown in FIG. 1, power management system 175 may be included within endpoint client system 100 for moderating the available power from the power source. In one embodiment, power management system 175 may be coupled to provide operating voltages on one or more power rails to various power-consuming components of endpoint client system 100, as well as to perform other power-related administrative tasks of the endpoint client system.

As shown in FIG. 1, out-of-band programmable integrated circuit 180 of endpoint client system 100 may be an embedded controller (EC) that is coupled to PCH 150 and which may be programmed to perform tasks such as power/thermal system management, etc. Out-of-band programmable integrated circuit 180 may also be programmed to execute program instructions to boot information handling system 100, load application firmware from NVM 190 into internal memory, launch application firmware, etc. Out-of-band programmable integrated circuit 180 may be, for example, a controller, microcontroller, microprocessor, ASIC, etc., or as a programmable logic device "PLD" such as FPGA, complex programmable logic device "CPLD", etc. Besides an embedded controller, other examples of out-band-programmable integrated circuits include, but are not limited to, baseboard management controller "BMC", service processor, embedded processor, remote access controller, etc. In this regard, an out-of-band programmable integrated circuit 180 is separate and independent from in-band host programmable integrated circuit 110 that runs the host OS 101 of the endpoint client system 100, and that executes without management of any application executing with the host OS 101 on the host programmable integrated circuit 110.

As shown in the exemplary embodiment of FIG. 1, EC 180 is coupled to PCH 150 within endpoint client system 100 via data bus 185, and NVM 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, NVM 190 may be a SPI Flash memory device that is a shared Flash memory device, which is connected to PCH 150 and EC 180. In such a configuration, PCH 150 provides EC 180 shared access to NVM 190 via eSPI bus 185, SPI bus 195, and various interface and logic blocks included within the PCH 150.

Also shown in the embodiment of FIG. 1 are network components of a system that are communicatively coupled via network/s 163 to automatically deploy vulnerability fixes for software and firmware components executing on endpoint client system 100 (and/or other endpoint client systems 159). These vulnerability fix system components include OEM library scanning server 145 (e.g., executing Dell Unified Request Management "DURM" available from OEM manufacturer Dell Technologies Inc. of Round Rock, Texas) that scans open source components usage (e.g., license terms, vulnerability scanning, etc.) in OEM endpoint client systems, library scanning server 149 (e.g., executing library scanning tools such as Palamida, Black Duck, White Source, etc.) that identifies and manages open source vulnerabilities and security issues, Jenkins server 151 that operates as an open source automation server to automate parts of software development related to building, testing and deploying software to facilitate continuous integration and continuous delivery of developed software, catalog generation service database server 147 (e.g., executing catalog generation service logic 143 that is coupled to a cumulative database maintained by OS abstraction (OSA) and OSA repository 141), tech portal server 146 (e.g., executing Dell TechDirect from Dell Technologies Inc. of Round Rock, Texas) that may implement embedded repository manager logic 142 such as Dell Cloud Command Repository Manager (DCCRM) from Dell Technologies Inc. of Round Rock, Texas to make available OSA catalog 144 to endpoint client system 100 across network/s 163), and an IT administrator server 153. Also shown in FIG. 1 is other catalog server 152 (e.g., such as Microsoft Endpoint Configuration Manager "MEMCM" available from Microsoft Corporation of Redmond, Wash.) that may be optionally present to contain and deploy update packages to client system 100 that are provided, for example, by an OEM manufacturer of endpoint client system 100. In one embodiment, other catalog server 152 and/or IT administrator server may be "on premise" servers operating at the same physical location as endpoint client system 100 and optionally coupled to endpoint client system 100 by an internal network such as previously described.

Figure 2:
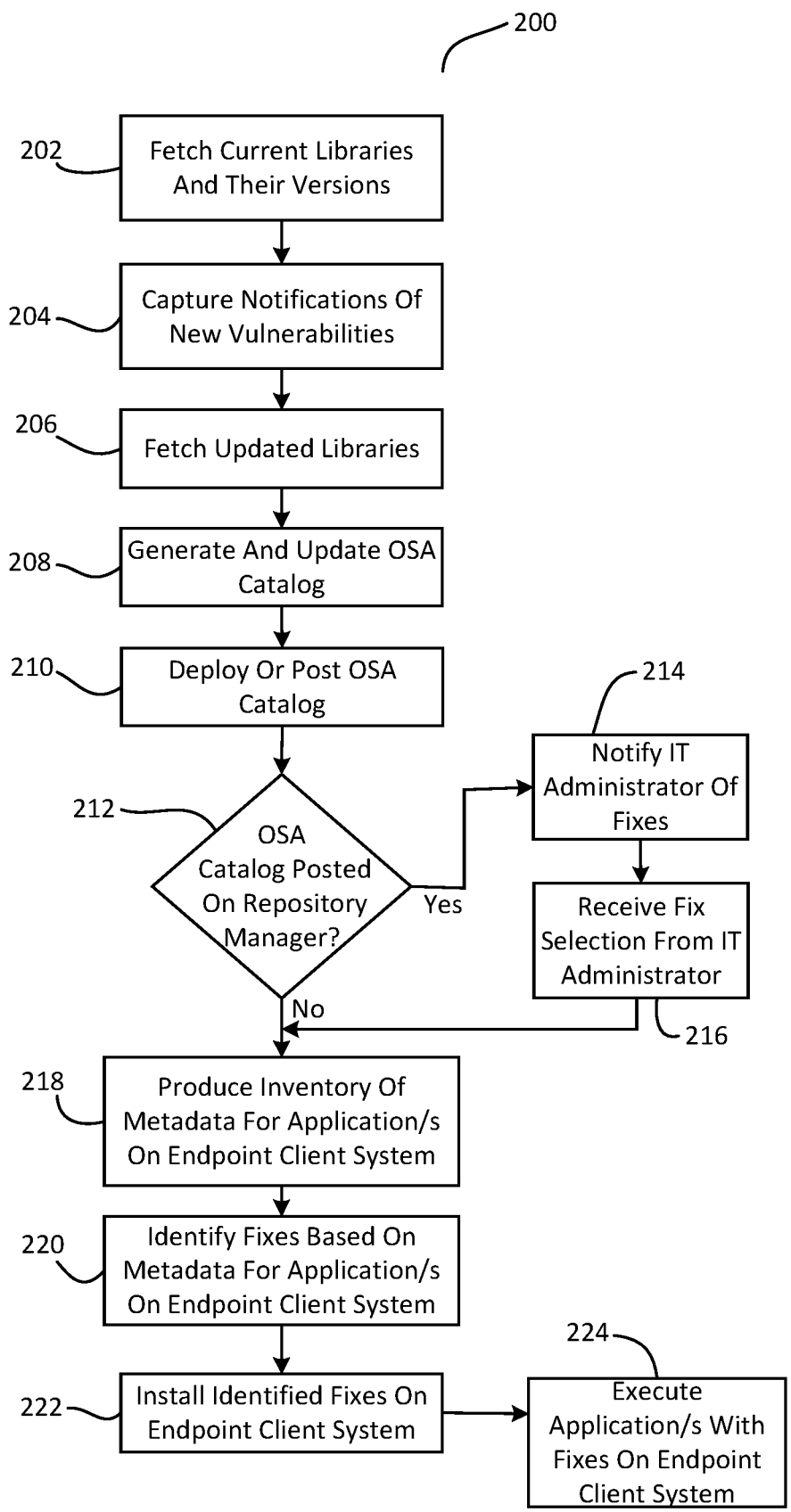
FIG. 2 illustrates methodology according to one exemplary embodiment of the disclosed methods and systems.
Figure 3:
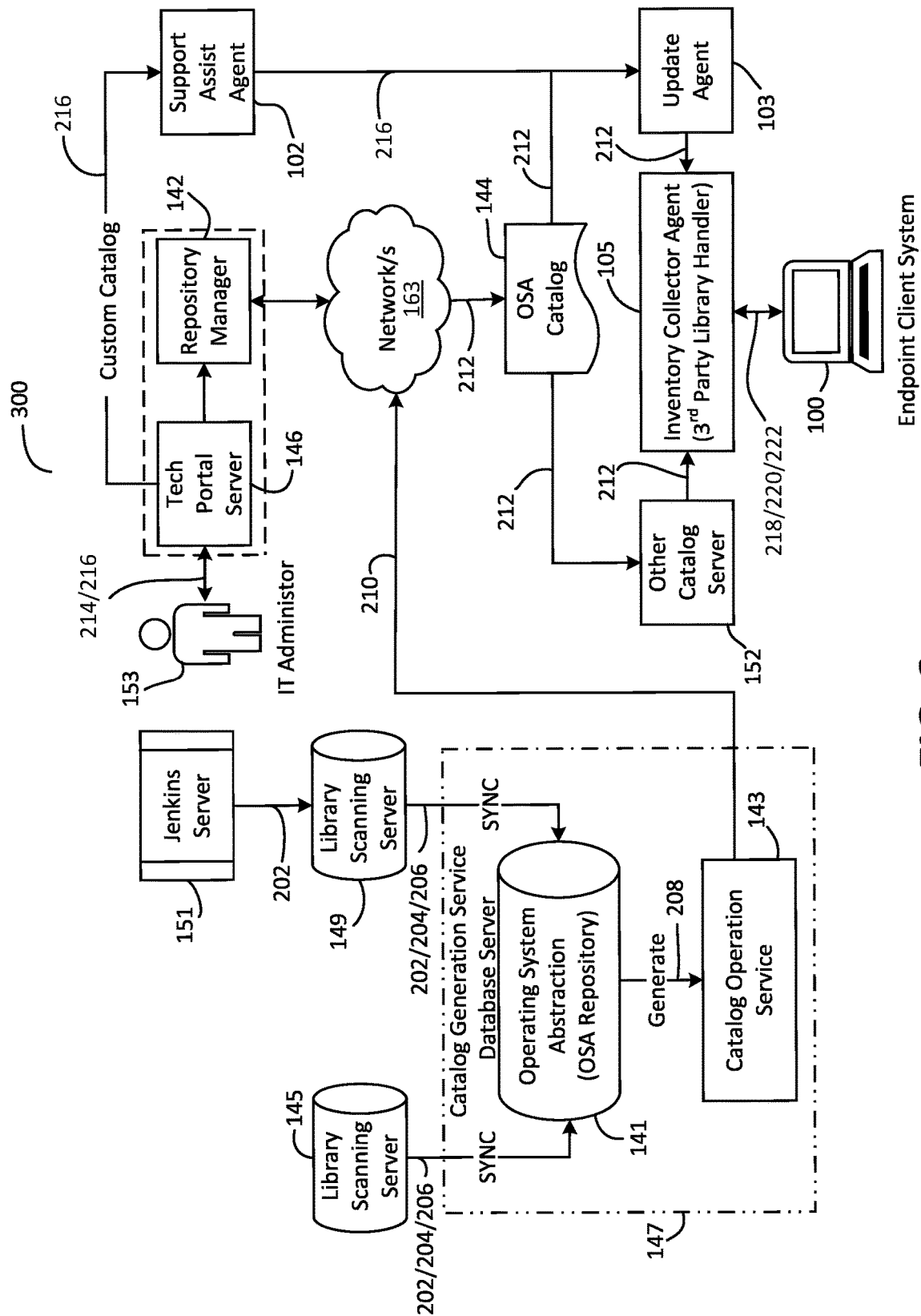
FIG. 3 illustrates information flow and architecture according to one exemplary embodiment of the disclosed methods and systems.

FIG. 2 illustrates one exemplary embodiment of a methodology 200 that may be implemented to automatically identify and roll out needed software and firmware fixes (e.g., patches or updates) for software and firmware installed and executing on endpoint client system 100 and any other endpoint client system/s 159 operating in a common corporate or other network environment. Such software and firmware may include any logic (software and/or firmware) that is installed and executed by a programmable integrated circuit of endpoint client system (e.g., host programmable integrated circuit 110, out of band programmable integrated circuit 180, etc.). Examples of such logic includes, but is not limited to, user applications 104, BIOS 194, etc. FIG. 3 illustrates an exemplary embodiment of information flow and architecture 300 that represents implementation of methodology 200 of FIG. 2 together with the embodiment of client information handling system/s 100/159 and vulnerability fix system of FIG. 1.

In block 202 of FIG. 2, catalog generation service database server 147 automatically connects (e.g., across network/s 163 or other data communication path) to existing third party library scanning tools executing on servers 145, 149 and 151 to fetch current third-party libraries and their versions into a cumulative database of OS abstraction and OSA repository 141 that maps software products (applications) to third party software libraries. Examples of such software products include, but are not limited to, software products developed by an OEM of endpoint client systems 100/159 and delivered to endpoint client systems 100/159 for the system management lifecycle, e.g., such as SOS recovery, BIOS configuration, driver and BIOS update, Dell Command Configure and Dell Command Monitor available from Dell Technologies Inc. of Round Rock, Texas.

In block 204, catalog generation service database server 147 may employ a publish/subscribe messaging system to automatically capture notifications from the library scanning tools executing on servers 145, 149 and 151 whenever a new vulnerability is confirmed by any of these library scanning tools executing on servers 145, 149 and 151. Such a software or firmware vulnerability may be a security flaw or weakness in a software or firmware component that may be, for example, exploited by a bad actor to interfere with and/or negatively impact operation of the software or firmware in such a way as to compromise its integrity and/or confidentiality, and/or to render it inoperable or unavailable.

In block 204, notifications from the library scanning tools executing on servers 145, 149 and 151 may include vulnerability information such as a common vulnerability scoring system (CVSS) score and/or common vulnerabilities and exposures (CVE) details that have been determined for each new discovered vulnerability. In this regard, a CVSS score indicates a qualitative measure of vulnerability severity (based on metrics of exploitability and impact) and is expressed with a number ranging from 1 to 10 (with the higher the number, the higher the severity of the vulnerability). CVE details may include an assigned CVE identification numbers and corresponding descriptions for publicly known software or firmware vulnerabilities.

In block 206 of methodology 200, catalog generation service database server 147 may employ an update system to automatically synchronize with library scanning tools executing on servers 145, 149 and 151, and to fetch updated libraries into the cumulative database of OS abstraction and OSA repository 141 as soon as any software or firmware library fixes (e.g., patches or updates) are made available by any of library scanning tools executing on servers 145, 149 and 151.

In block 208, catalog generation service 143 executing on catalog generation service database server 147 maintains an OSA catalog 144 on a system storage of server 147. Catalog generation service 143 automatically generates and automatically updates the OSA catalog 144 which contains the corresponding versions for the list of third party libraries and their associated software and/or firmware applications from the updated cumulative database of OS abstraction and OSA repository 141 (e.g., including metadata information for all the open source components used by the software products provided by an OEM of endpoint client systems 100/159 for their endpoint client systems 100/159). When any discovered vulnerabilities within a given library is addressed with a fix (e.g., by replacing existing code of the given library with new or updated code that is added to the cumulative database of OS abstraction and OSA repository 141), catalog generation service 143 automatically updates OSA catalog 144 with the resulting "fixed" newer version of the given library, as well as corresponding vulnerability information regarding the resolved vulnerabilities that have been so addressed in the given library (such as the CVSS score and/or CVE details corresponding to these resolved vulnerabilities). The identity of any software and/or firmware applications that employ the given fixed library may also be included in the updated OSA catalog 144. In this regard, OSA catalog 144 may include a mapping of individual software or firmware applications to third party libraries that are used by each of them.

Figure 4:
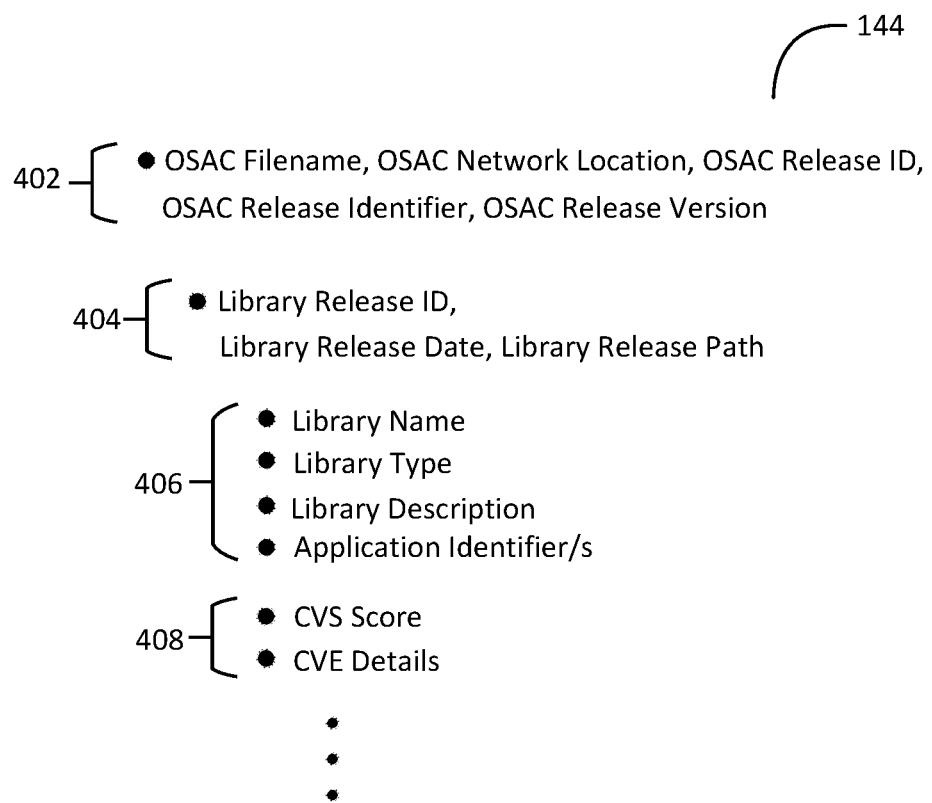
FIG. 4 illustrates information layout of a generated OSA catalog according to one exemplary embodiment of the disclosed methods and systems.

As an example, FIG. 4 illustrates information layout of a generated OSA catalog (OSAC) 144 of block 208, it being understood that a given generated OSA catalog 144 of block 208 may optionally include one or more entries for multiple different respective corresponding third party libraries. In FIG. 4, OSA catalog 144 includes OSAC information 402, e.g., such as filename and network location of the components of OSA catalog 144, release identifier (ID), release date and release version for OSA catalog 144. A first entry of OSA catalog 144 of FIG. 4 also includes library information 404 for the given library addressed by the library vulnerability fix of this first entry of the OSA catalog 144, e.g., third party library release ID, third party library release date, and third party release path on network/s 163. The first entry of OSA catalog 144 also includes library information 406 for the given library, e.g., third party library name, third party library type, third party library description, and a mapping of IDs of one or more software and/or firmware applications on endpoint client system/s 100 and/or 159 that use the given third party library. Also included in the first entry of OSA catalog 144 of FIG. 4 is vulnerability information 408 for the vulnerability addressed by the library vulnerability fix of this entry of the OSA catalog 144, e.g., CVSS score (e.g., vulnerability severity) and CVE details (e.g., vulnerability description) for the library vulnerability fix of this first entry of the OSA catalog 144. OSA catalog 144 may optionally include one or more additional entries for different library vulnerability fixes of one or more different respective libraries, in which case the additional entries may employ a similar layout format as the first entry.

It will be understood that the particular layout of the OSA catalog entry of FIG. 4 is exemplary only, and that an OSA catalog entry may employ other layouts. Moreover, the particular number and types of different OSAC information and library information may vary, and that additional and/or alternative types of OSAC information and/or library information may be included in an OSA catalog entry.

Next, in block 210 of FIG. 2, catalog generation service database server 147 automatically deploys the updated OSA catalog 144 across network/s 163 to at least one storage location (e.g., system storage of tech portal server 146) that may be employed as a repository manager 142, e.g., which may be embedded and extended within tech portal server 146. In block 210, OSA catalog 144 may be alternatively otherwise posted to another storage location (e.g., at a URL location within cloud storage on network/s 163, for example cloud storage location hosted by OEM of endpoint client systems 100/159 such as "http://downloads.OEM.com/catalog") that is accessible by repository manager 142, update agent 103, and/or other catalog server 152 (e.g., a Microsoft Endpoint Configuration Manager "MEMCM" that manages and provides particular Windows updates together with OEM-provided updates needed for endpoint client system 100, Linux update manager that manages and provides particular Linux updates and OEM-provided updates needed for endpoint client system 100, etc.) via network/s 163. In one embodiment, OSA catalog 144 may be extended to an OEM third party library catalog containing OEM update packages for other catalog server 152 (e.g., an OEM-provided catalog containing list of updates for OEM endpoint client systems adhering to an OS schema such as Microsoft schema). As shown in FIG. 2, blocks 202 to 210 may continuously iterate so that the updated OSA catalog 144 is automatically kept up to date in the manner described above.

If OSA catalog 144 is posted (e.g., deployed or retrieved) on repository manager 142 in block 212, then methodology 200 may proceed to block 214 where repository manager 142 that is integrated on tech portal server 146 may notify human IT administrator/s of software and/or firmware library fixes available in OSA catalog 144 via IT administrator server 153. However, if OSA catalog is not posted on repository manager 142 in block 212, then methodology 200 proceeds to block 218 described later below.

As part of the notification provided in block 214, repository manager 142 may provide vulnerability information (e.g., CVSS score, CVE details, etc.) through tech portal server 146 to IT administrator server 153 for each given available software and/or firmware library fix together with the identity of software and/or firmware applications that employ the software and/or firmware library that is addressed by the given available software and/or firmware library fix. In block 216, the IT administrator/s may view the vulnerability information (e.g., CVSS score, CVE details, etc.) and affected applications for each available software and/or firmware library fix (e.g., on a display device of tech portal server 146), and use this information to select particular available software and/or firmware library fix/es to prioritize and deploy first in a custom catalog (e.g., according to severity of vulnerability addressed by the fixes, importance of applications affected, etc.). The selected fix/es of this custom catalog may then be provided as a custom OSA catalog (e.g., having an information layout similar to layout 400 of FIG. 4) through support assist agent 102 to update agent 103 and/or other catalog server 152 for use in block 220 described below. This enables the IT administrator/s to deploy selected available software and/or firmware library fixes faster to end point client system 100 and any other endpoint client systems 159 that are operating in the network environment administered by the IT administrator/s who are users of IT administrator server 153.

In block 218, enhanced inventory collector agent 105 executing on endpoint client system 100 (and executing on any other endpoint client systems 159) may produce an inventory that identifies individual installed applications (e.g., individual vendor certified applications) on the endpoint client system/s 100/159. In one embodiment, this inventory may include metadata for the individual installed applications, e.g., metadata including, but limited to, the installation path for each given installed application on endpoint client system 100/159, a component identifier (ID) for each given installed application on endpoint client system 100/159, and the identity of all third party libraries used by each given installed application on endpoint client system 100/159. Enhanced inventory collector agent 105 may provide the inventory (e.g., metadata) to update agent 103 and/or other catalog server 152 depending on their presence in the particular architecture of the interconnected components of FIGS. 1 and 3.

In block 220, update agent 103 and/or other catalog server 152 parses the inventory supplied by enhanced inventory collector agent 105 and identifies the available software and/or firmware library fixes for third party libraries used by the particular applications identified in the inventory of metadata provided by enhanced inventory collector agent 105. In the case that block 212 is "No", then update agent 103 and/or other catalog server 152 identifies the software and/or firmware library fixes from those fixes available in the entire OSA catalog for third party libraries used by the particular applications identified in the inventory of metadata. However, in the case that block 212 is "Yes", then then update agent 103 and/or other catalog server 152 identifies the software and/or firmware library fixes of the custom catalog selected by the IT administrator/s in block 216 that corresponds to third party libraries used by the particular applications identified in the inventory of metadata. Then in block 222, update agent 103 and/or other catalog server 152 installs the identified software and/or firmware library fixes from block 220 on to endpoint information handling system/s 100/159, e.g., by patching or updating the particular application/s identified in the inventory of metadata on system/s 100/159. After block 222, host programmable integrated circuit 110 or other programmable integrated circuit/s of endpoint system 100 may in block 224 execute the updated application/s of block 220.

It will be understood that the particular combination of blocks of methodology 200 are exemplary only, and that other combinations and/or order of additional, fewer, and/or alternative blocks may be employed that are suitable for automatically identifying and deploying needed software and firmware fixes for software and firmware installed and executing on an endpoint client system.

It will also be understood that one or more of the tasks, functions, or methodologies described herein (e.g., including those described herein for components 101, 102, 103, 104, 105, 110, 142, 143, 145, 146, 147, 149, 151, 152, 153, 154, 180, 194, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more blocks of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more blocks of the present methodologies may be employed in one or more code segments of the computer program. For example, a code segment executed by the information handling system may include one or more blocks of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method, comprising:
   producing a catalog comprising current versions of one or more software or firmware components used by a software or firmware application together with information that specifies that an identity of at least one software or firmware application that uses the one or more software or firmware components;
   receiving across at least one network an identity of a vulnerability that is present in a current version of a first software or firmware component of the one or more software or firmware components maintained in the catalog;
   receiving across the at least one network a new version of the first software or firmware component that does not include an identified vulnerability, and modifying the catalog to replace the current version of the first software or firmware component with the new version of the first software or firmware component;
   providing the modified catalog to at least one network storage location present on the at least one network;
   producing an inventory that identifies installed software or firmware applications on an endpoint client system that is communicatively coupled to the at least one network, at least one of the installed software or firmware applications using the first software or firmware component;
   accessing the information of the catalog on the at least one network storage location to determine that the catalog includes the new version of the first software or firmware component used by the at least one of the installed software or firmware applications; and
   then retrieving the new version of the first software or firmware component from the catalog across the at least one network from the network storage location, and installing the new version of the first software or firmware component onto the endpoint client system for use by the at least one installed software or firmware application.

2. The method of claim 1, where the one or more software or firmware components is each a software or firmware library; and where the first software or firmware component is a first software or firmware library.

3. The method of claim 2, further comprising receiving, from across the at least one network, vulnerability information corresponding to the identified vulnerability; and where the modifying the catalog further comprises adding to the catalog the vulnerability information corresponding to the identified vulnerability.

4. The method of claim 3, further comprising receiving, from across the at least one network, a notification containing the identity of the vulnerability together with the vulnerability information corresponding to the identified vulnerability, the vulnerability information comprising at least one of a measure of a relative severity of the identified vulnerability or a description of the identified vulnerability.

5. The method of claim 2, where the inventory comprises at least one of an installation path for each installed software or firmware application on the endpoint client system, or a component identifier (ID) for each installed software or firmware application on the endpoint client system.

6. The method of claim 2, where the inventory comprises an identity of all software or firmware libraries used by each identified installed software or firmware application on the endpoint client system.

7. The method of claim 2, where the at least one network storage location is accessible across the at least one network by an information technology (IT) administrator system; and where the method further comprises providing from the catalog the vulnerability information together with the identity of the at least one software or firmware application that uses the first software or firmware library to the IT administrator system.

8. The method of claim 7, further comprising in response to the providing of the catalog to the IT administrator information system:
   then receiving a selection from the IT administrator information system that identifies a new version of the first software or firmware library for installation onto a designated endpoint client system that is communicatively coupled to the at least one network;
   then producing a custom catalog comprising the new version of the selected first software or firmware library together with information that specifies the identity of the at least one software or firmware application that uses the first software or firmware libraries; and
   then installing the new version of the first software or firmware library onto the endpoint client system for use by the at least one installed software or firmware application.

9. The method of claim 2, further comprising executing, on at least one programmable integrated circuit of the endpoint client system, the at least one installed software or firmware application using a new version of the first software or firmware library.

10. The method of claim 2, where the inventory comprises:
    at least one of an installation path for each installed software or firmware application on the endpoint client system, or a component identifier (ID) for each installed software or firmware application on the endpoint client system; and
    an identity of all software or firmware libraries used by each identified installed software or firmware application on the endpoint client system.

11. A system, comprising at least one first information handling system configured as an endpoint client system comprising at least one programmable integrated circuit and being coupled to at least one network, the at least one programmable integrated circuit of the endpoint client system being programmed to:
    produce an inventory that identifies installed software or firmware applications on the endpoint client system, at least one of the installed software or firmware applications using a current version of a first software or firmware component;
    access information of a catalog maintained on at least one network storage location to determine that the catalog includes a new version of the first software or firmware component used by the at least one installed software or firmware application;
then retrieve the new version of the first software or firmware component from the catalog across the at least one network from the network storage location; and
then install the new version of the first software or firmware component onto the endpoint client system for use by the at least one installed software or firmware application;
where the first software or firmware component is a first software or firmware library; and
where the system further comprises a second information handling system comprising at least one programmable integrated circuit and being coupled to the at least one network, the at least one programmable integrated circuit of the second information handling system being programmed to:
produce the catalog to comprise current versions of one or more software or firmware libraries and that specifies an identity of at least one software or firmware application that includes at least one installed software or firmware application and that uses the first software or firmware library,
receive across the at least one network an identity of a vulnerability that is present in a current version of the first software or firmware library maintained in the catalog, and receive across the at least one network a new version of the first software or firmware library that does not include an identified vulnerability,
modify the catalog to replace the current version of the first software or firmware library with the new version of the first software or firmware library, and
provide the modified catalog to the at least one network storage location present on the at least one network.

12. The system of claim 11, where the inventory comprises:
at least one of an installation path for each installed software or firmware application on the endpoint client system, or a component identifier (ID) for each installed software or firmware application on the endpoint client system; and
an identity of all software or firmware libraries used by each identified installed software or firmware application on the endpoint client system.

13. The system of claim 11, the at least one programmable integrated circuit of the second information handling system being programmed to receive, from across the at least one network, vulnerability information corresponding to the identified vulnerability; and
being programmed to modify the catalog by adding to the catalog the vulnerability information corresponding to the identified vulnerability, the vulnerability information comprising at least one of a measure of a relative severity of the identified vulnerability or a description of the identified vulnerability.

14. The system of claim 13, further comprising a third information handling system comprising at least one programmable integrated circuit and being communicatively coupled to the at least one network, the programmable integrated circuit of the third information handling system being programmed to:
access the catalog on the at least one network storage location, and provide from the catalog the vulnerability information together with an identity of the at least one installed software or firmware application that uses the first software or firmware library to an administrator user,
then receive a selection from the administrator user that identifies the new version of the first software or firmware library for installation onto the endpoint client system, and
then, in response to the administrator user selection, produce a custom catalog comprising the new version of the selected first software or firmware library together with information that specifies the identity of the at least one installed software or firmware application that uses the first software or firmware library, and make the custom catalog available on the at least one network,
where the at least one programmable integrated circuit of the endpoint client system is further programmed to:
retrieve the new version of the first software or firmware library from the custom catalog across the at least one network,
install the new version of the first software or firmware library onto the endpoint client system for use by the at least one installed software or firmware application, and
execute the at least one installed software or firmware application using the new version of the first software or firmware library.

15. The system of claim 14, where the second and third information handling systems are separate and different servers that are communicatively coupled across the at least one network to the endpoint client system.

16. The system of claim 11, where the endpoint client system has an original equipment manufacturer (OEM); and where the first software or firmware component is a third party software of firmware component that is provided by an entity other than the OEM or a customer of the OEM who operates the endpoint client system.

17. A method, comprising:
producing an inventory on an endpoint client system that identifies installed software or firmware applications on the endpoint client system, at least one of the installed software of firmware applications using a current version of a first software or firmware component;
accessing, from the endpoint client system, information of a catalog maintained on at least one network storage location to determine that the catalog includes a new version of the first software of firmware component that corresponds to the current version of the first software or firmware component that is used by the at least one of the installed software or firmware applications on the endpoint client system;
then retrieving the new version of the first software or firmware component to the endpoint client system from the catalog across the at least one network from the network storage location; and
then installing the new version of the first software or firmware component onto the endpoint client system for use by the at least one installed software or firmware application;
where the first software or firmware component is a first software or firmware library; and
where the catalog further includes vulnerability information corresponding to an identified vulnerability of a current version of the first software or firmware library that is not included in a new version of the first software of firmware library, the vulnerability information comprising at least one of a measure of a relative severity of the identified vulnerability or a description of the identified vulnerability.

18. The method of claim 17, where the inventory comprises:
    at least one of an installation path for each installed software or firmware application on the endpoint client system, or a component identifier (ID) for each installed software or firmware application on the endpoint client system; and
    an identity of all software or firmware libraries used by each identified installed software or firmware application on the endpoint client system.

19. The method of claim 17, where the endpoint client system has an original equipment manufacturer (OEM); and where the first software or firmware component is a third party software of firmware component that is provided by an entity other than the OEM or a customer of the OEM who operates the endpoint client system.

* * * * *